(No Model.)
2 Sheets—Sheet 1.
T. J. THOMAS.
BUTTER OR CHEESE CUTTER.
No. 547,463.
Patented Oct. 8, 1895.
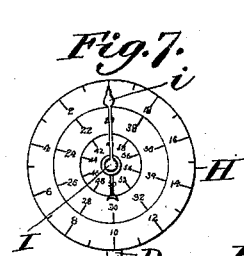
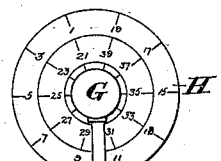
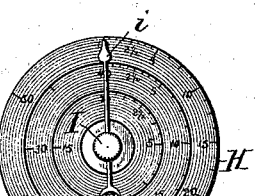
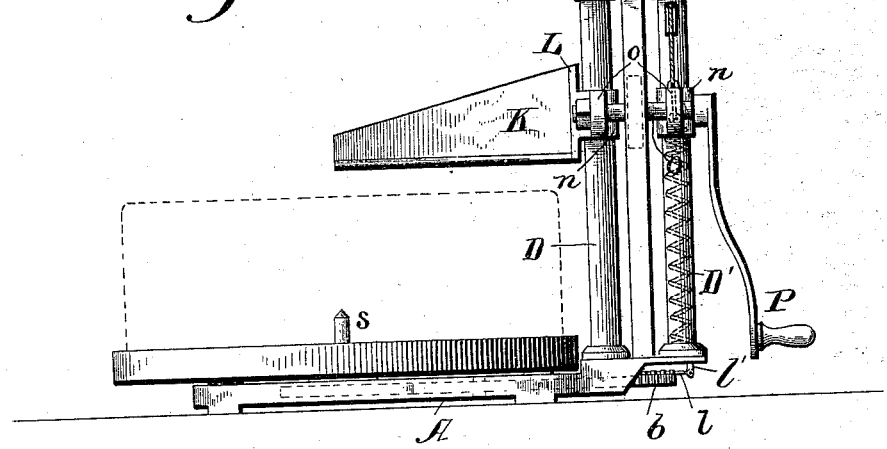
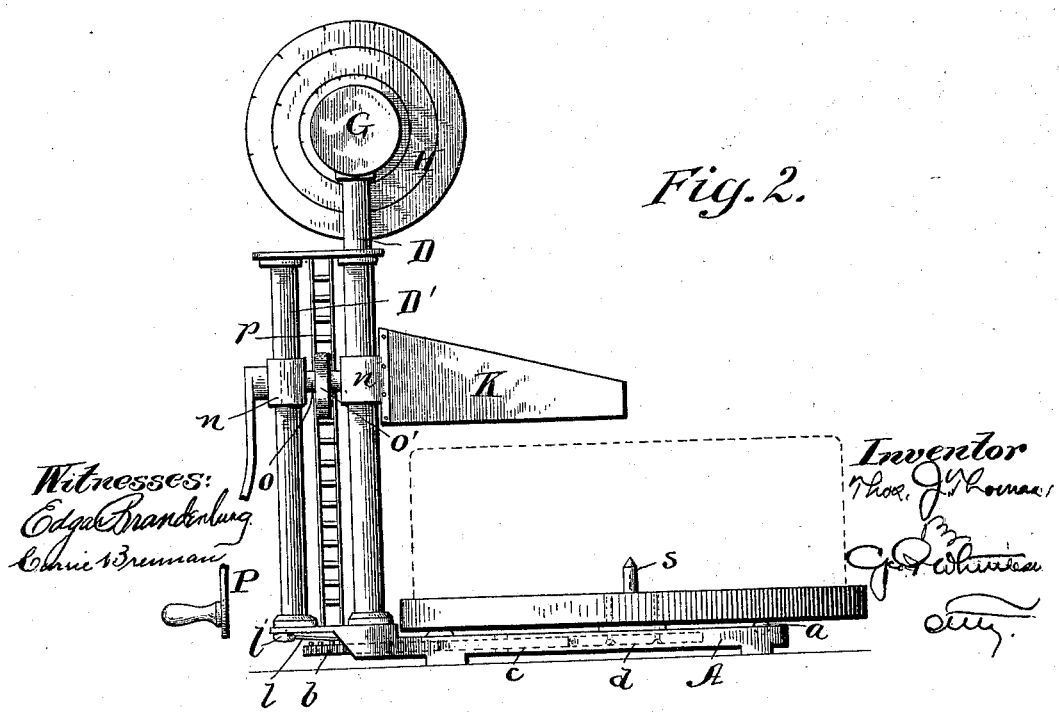

(No Model.) 2 Sheets—Sheet 2.

T. J. THOMAS.
BUTTER OR CHEESE CUTTER.

No. 547,463. Patented Oct. 8, 1895.

Witnesses:
Elga Brandenburg
Carrie Brennan

Inventor:
Thos. J. Thomas
By Geo. H. Whitney
Atty.

UNITED STATES PATENT OFFICE.

THOMAS J. THOMAS, OF MINERSVILLE, PENNSYLVANIA.

BUTTER OR CHEESE CUTTER.

SPECIFICATION forming part of Letters Patent No. 547,463, dated October 8, 1895.

Application filed November 9, 1894. Serial No. 528,342. (No model.)

*To all whom it may concern:*

Be it known that I, THOMAS J. THOMAS, a citizen of the United States, residing at Minersville, in the county of Schuylkill and State of Pennsylvania, have invented certain new and useful Improvements in Butter or Cheese Cutters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in butter and cheese cutters, the object being to provide a device that will cut the exact weight from any size cheese which has been placed upon the supporting-table.

In carrying out my invention I use a rotating table or support, upon which a cheese is properly centered, a series of gear-wheels for operating the same, an indicating mechanism in connection with one of said gear-wheels whereby when the indicator is being set to a certain position the rotating table is automatically moved the proper distance, and a knife with suitable means for operating it.

The invention consists in the various mechanisms hereinafter described, and referred to in the appended claims.

The invention is illustrated in the accompanying drawings, in which—

Figure 3:
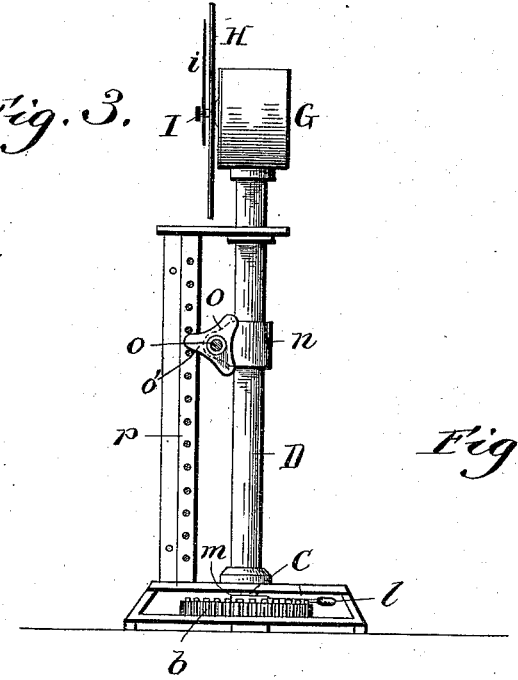
Figure 4:
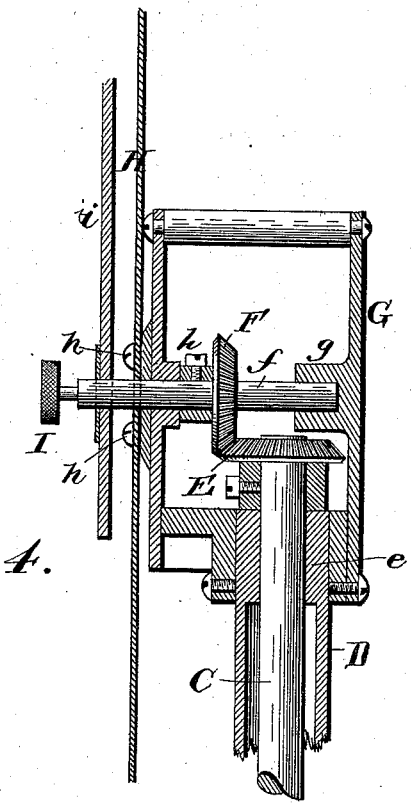
Figure 5:
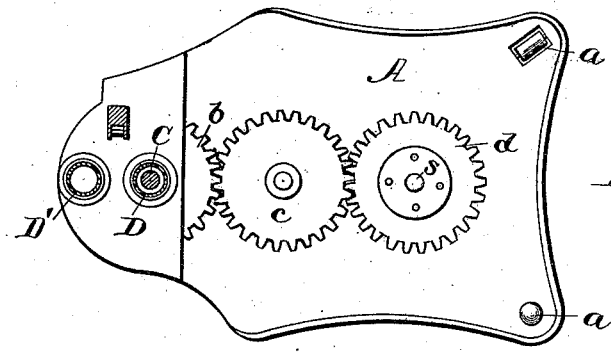
Figure 6:
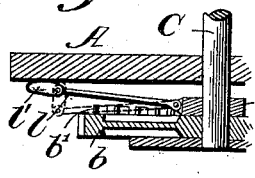

Figure 1 represents a front view in elevation of my cheese-cutting apparatus. Fig. 2 is a rear view of the same. Fig. 3 is a side view, partly in section. Fig. 4 is a large sectional detail view showing the apparatus for operating the indicator. Fig. 5 is a top plan view of the bed-plate, showing the operating gear-wheels. Fig. 6 is an enlarged sectional detail view of the hand-lever for operating the first gear-wheel and through it the rotating table, and Figs. 7 and 8 show the graduations on the opposite sides of the dial.

In the drawings, A represents the bed-plate, which is preferably of cast metal, of the form shown in Fig. 5, and has at suitable places a ball or roller $a$ to lessen the friction of the rotating table upon which the cheese is supported. Upon this bed-plate A is journaled a series of connecting gear-wheels. Three $b\ c\ d$ are herewith shown, the two latter journaled, respectively, upon the upright posts secured to the bed-plate. One of these gear-wheels $d$ is rigidly secured to the under surface of the rotating table B by means of screws and is made flat on the side next to the table, and when the wheels are turned, the number of teeth being equal in all, each wheel and the table will turn through a corresponding angular distance.

To the center of the gear-wheel $b$ is secured an upwardly-extending rod or shaft C, which passes up through the column D, and is journaled at the upper end of said column in the bearing $e$. This shaft C carries on its upper end a miter-gear E, which meshes with a vertical miter-gear F on the shaft $f$, which is journaled in bearings $g\ h$ on the framework G, which supports the dial H. This dial H is herein shown as divided into three circles representing, respectively, twenty, forty, and sixty pound cheeses, each circle being divided off into a number of divisions corresponding to the number of pounds in the cheese to be weighed. The pointer $i$ on the end of the shaft $f$ is adjustable by means of the set-screw I, in order that it may be used to point off pounds on any of the three circles. It will of course be understood that the dial may be divided into a greater or less number of circles, as desired, according to the weight of cheese which is to be cut. There may be graduations on each side of the dial and it is reversible, being held by the screws $h$. This enables a smaller dial to be used, since the graduations on one side may be given the even numbers, while those on the other side are odd. Furthermore, each set of graduations can be spaced farther apart than they would be if both were on the same side, thereby insuring greater accuracy in weighing. The dial can be easily and quickly reversed when it is desired to cut a quantity whose weight is marked on the other side from that which has been in use previously. It will be readily seen, therefore, that with the cheese properly centered on the rotatable table the movement of the gear-wheel $b$ will move the pointer and at the same time rotate the table in a corresponding ratio. For example, suppose it is desired to measure off two pounds on the cheese. The wheel *b* will be rotated until the pointer is moved two points on either one of the three circles to which it has been set and at the same time the board will move such a distance as to lay off a slice of cheese just two pounds in weight.

In order to provide a convenient means for operating the device, I provide a hand-lever *l*, which is hinged at its inner end to a sleeve *m* loosely embracing the shaft C. The handle *l'* of the lever is hinged thereto, and being eccentric in shape it can be turned up against the under side of the bed-plate, so as to act as a cam and hold the lever down. The upper face of the wheel *b* is provided with projections *b'* and when the lever *l* is pulled down it falls in between these projections, and by moving it in either direction the gear-wheel *b* and the remaining parts of the apparatus are moved. When sufficient movement has taken place the operator turns up the handle *l'* against the under side of the bed-plate, thereby locking the lever and wheel in place. Instead of the construction shown, I can provide the lever with a V-shaped tooth on its under side so that when in its lowered position this tooth catches in the teeth of t e wheel, the projections *b'* being omitted.

It will be understood that the cheese is properly centered on the movable table and upon the central projection *s*. The knife K is attached to a casing L, which comprises sleeves *n n* embracing, respectively, the hollow tubes D D'. Journaled in projections *o* on these sleeves is a shaft O, to which is attached the crank P. Between the two guiding-posts D D' is an upright part having crosspieces *p* extending between two side bars and forming in effect a vertical rack. Upon the shaft O is a cog-wheel O', the teeth of which successively engage the spaces between any two cross-bars of the rack, and thereby in the rotation of the shaft O raise or lower the knife K. These cross-pieces are preferably loosely journaled, so as to roll as the cog-wheel works on them. The knife is of sufficient length to reach to the center of the cheese, so that in the complete downward reciprocation of the knife a solid triangular piece of cheese is sliced off.

It will be understood that I may provide automatic means for returning the knife to its highest position after it has performed the operation of cutting, and I would preferably do this by having a spring in the guide D' and providing a chain running over a small pulley at the top, the chain being attached to a tension-spring, so that when the knife is coming down the spring will expand as the chain pulls upon it, and when the knife is released the spring will pull it up to normal position.

It will be understood that an ordinary rack and pinion may be substituted for the means herein shown for lowering the knife, and also that many minor modifications may be made without departing from the spirit of the invention.

Having thus described my invention, what I claim, and desire to secure by Letters Patent, is—

1. In combination with the bed plate having a series of gear wheels supported thereon, a rotating table rigidly secured to one of said gear wheels, anti-friction rollers between the table and the bed plate, an indicating mechanism operatively connected with one of the gear wheels, an operating lever adapted to be thrown into and out of engagement with one of said gear wheels and movable in an arc concentric with said wheel and a reciprocating knife with means for operating it; substantially as described.

2. In a cheese cutter, the combination with the rotatable table and the indicating mechanism, of operative mechanism for moving these parts in unison, said mechanism including a gear wheel, and a movable hand lever fulcrumed adjacent to said gear wheel and adapted to move into and out of engagement with teeth upon said gear wheel, and movable in an arc concentric with said wheel substantially as described.

3. In a cheese cutter, the combination with a rotatable table, of gear wheels for moving the same, and an operating lever adjacent to one of said gear wheels and fulcrumed on a joint permitting it to move both concentrically with and perpendicularly to said wheel substantially as described.

4. In a cheese cutter, the combination with a bed plate, of a rotatable table supported thereon, gear wheels for moving said table, and an operating lever fulcrumed adjacent to one of said gear-wheels and adapted to actuate said gear wheel, said lever having a pivoted handle adapted to be turned up against the bed plate to lock the handle and gearing in any desired position, substantially as described.

5. In a cheese cutter, the combination with a rotatable table of a gear wheel geared to rotate therewith, an upright shaft rigidly secured to said gear wheel, indicating mechanism operated by said shaft, and a lever fulcrumed on a sleeve loosely embracing said shaft, and adapted to engage with said gear wheel when it is desired to operate the same, substantially as described.

6. In a cheese cutter, the combination with the movable table, of an indicator geared therewith, and a reversible dial having graduations on both sides, the two sets of graduations when taken together making a complete series, substantially as described.

In testimony whereof I affix my signature in presence of two witnesses.

THOMAS J. THOMAS.

Witnesses:
JOHN H. MERKEL,
W. W. JONES.